United States Patent
Wooten et al.

(10) Patent No.: US 7,089,338 B1
(45) Date of Patent: Aug. 8, 2006

(54) METHOD AND APPARATUS FOR INTERRUPT SIGNALING IN A COMMUNICATION NETWORK

(75) Inventors: David Wooten, Escondido, CA (US); Stuart Allman, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 255 days.

(21) Appl. No.: 10/198,418

(22) Filed: Jul. 17, 2002

(51) Int. Cl.
*G06F 3/00* (2006.01)
*G06F 3/05* (2006.01)
*G06F 13/00* (2006.01)

(52) U.S. Cl. .............................. 710/110; 710/8; 710/48
(58) Field of Classification Search .................. 710/48, 710/301, 8, 110
See application file for complete search history.

(56) References Cited

U.S. PATENT DOCUMENTS

| | | | | |
|---|---|---|---|---|
| 4,689,740 A | * | 8/1987 | Moelands et al. ........... | 713/600 |
| 5,146,567 A | * | 9/1992 | Kao ............................ | 710/72 |
| 5,473,635 A | * | 12/1995 | Chevroulet ................. | 375/287 |
| 5,710,890 A | * | 1/1998 | Hermer ....................... | 710/106 |
| 5,758,098 A | * | 5/1998 | Townsley et al. ........... | 710/301 |
| 5,848,072 A | * | 12/1998 | Prill et al. ................... | 370/471 |
| 5,852,406 A | * | 12/1998 | Edde et al. ................. | 340/825.2 |
| 6,092,138 A | * | 7/2000 | Schutte ....................... | 710/113 |
| 6,598,107 B1 | * | 7/2003 | von der Wense et al. ... | 710/305 |
| 6,697,897 B1 | * | 2/2004 | Friel et al. .................. | 710/105 |
| 6,789,136 B1 | * | 9/2004 | Dunstan ....................... | 710/8 |

OTHER PUBLICATIONS

The I2C Bus Specification, Version 2.1, Jan. 2000, doc. No. 9398393 40011.*

* cited by examiner

*Primary Examiner*—Rehana Perveen
*Assistant Examiner*—Christopher Daley

(57) ABSTRACT

A method and apparatus for interrupt signaling. A communication network is described comprising a master device and a slave device that are both coupled to a two wire serial bus for communication. The two wire serial bus comprises a serial data (SDA) line and a serial clock line. The master device controls communication between the master device and the slave device. The slave device is capable of generating an interrupt signal during an idle condition over the SDA line for requesting a communication transaction with the master device. Also, a method is described for recognizing an interrupt at the master device. During an idle condition over the SDA line, the master device reads the SDA line low. Previously, the slave device pulls the SDA line low during the idle condition. The master device recognizes the reading of the SDA line low as an interrupt signal from the slave device requesting the communication transaction.

29 Claims, 12 Drawing Sheets

800

START

DURING AN IDLE CONDITION OVER A 2 WIRE SERIAL BUS, GENERATING A HIGH TO LOW TRANSITION OVER A SERIAL DATA (SDA) LINE BY ASSERTING THE SDA LINE AT A SLAVE DEVICE, THE SLAVE DEVICE COUPLED TO THE 2 WIRE SERIAL BUS COMPRISING THE SDA LINE AND A SERIAL CLOCK (SCL) LINE
810

RECOGNIZING THE HIGH TO LOW TRANSITION AT A MASTER DEVICE DURING THE IDLE CONDITION AS AN INTERRUPT SIGNAL FROM THE SLAVE DEVICE THAT IS REQUESTING A COMMUNICATION TRANSACTION WITH THE MASTER DEVICE, THE MASTER DEVICE COUPLED TO THE 2 WIRE SERIAL BUS
820

CONTROLLING THE 2 WIRE SERIAL BUS AT THE MASTER DEVICE FOR COORDINATING DATA TRANSMISSION BETWEEN THE MASTER DEVICE AND THE SLAVE DEVICE DURING THE COMMUNICATION TRANSACTION
830

STARTING THE COMMUNICATION TRANSACTION AT THE MASTER DEVICE
840

CONDUCTING THE COMMUNICATION TRANSACTION AT THE MASTER DEVICE
850

GENERATING A STOP CONDITION OVER THE 2 WIRE SERIAL BUS AT THE MASTER DEVICE WHEN THE COMMUNICATION TRANSACTION IS COMPLETE THEREBY RENDERING THE IDLE CONDITION
860

END

FIGURE 8

METHOD AND APPARATUS FOR INTERRUPT SIGNALING IN A COMMUNICATION NETWORK

BACKGROUND OF THE INVENTION

1. Field of the Invention

Embodiments of the present invention relate to the field of communication bus interfaces. More particularly, embodiments of the present invention relate generally to the generation of an interrupt condition from a slave device in a communication network including the slave device and a master device.

2. Related Art

The I²C bus is a two wire serial bus interface and is comprised of a serial data (SDA) line and a serial clock (SCL) line. The I²C bus is controlled by a master device that coordinates communication between the master device and various slave devices over the SDA line. Because of its simplistic two wire bi-directional nature, the I²C bus maximizes hardware efficiency and circuit simplicity. The I²C bus provides more chip flexibility in function and lowers interconnecting costs by reducing board space and pin count. As such, the I²C bus is a desired choice for communication interfaces and is able to support an extremely broad range of I²C compatible chips and their corresponding devices.

Typically, the master device initiates a communication transaction with a particular slave device over the I²C bus. This can be accomplished by the master device by addressing a selected slave device with a read/write access request. A start condition may be generated over the SDA line by the master device to inform all of the devices coupled to the I²C that a communication transaction is under process. After the slave acknowledges initiation of the communication transaction, the master device can send data to the slave device or receive data from the slave device.

However, each slave device on the I²C bus may need to interrupt the master device upon an asynchronous event. For example, a slave device may inform the master device of the completion of a task, when a buffer is full or empty, etc. A typical I²C bus may handle up to 128 slave devices. Since each slave device may need to generate an interrupt signal for requesting service by the master device, the master device may require up to 128 discrete interrupt input pins.

Conventional Art FIG. 1A is a block diagram of a communication network 100A that is comprised of a master device 110 for controlling communication over the two wire serial bus 120. The communication network 100A can be comprised of a plurality of slave devices 130 coupled to the two wire serial bus 120. The plurality of slave devices 130 can be comprised of N slave devices, e.g., slave device 140, slave device 150, and slave device 160, etc.

The two wire serial bus can be comprised of a serial data (SDA) line 122 and a serial clock (SCL) line 124. Each of the plurality of slave devices 130 is coupled to the SDA line 122 in parallel. In addition, each of the plurality of slave devices 130 is coupled to the SCL line 124 in parallel.

The current practice for an I²C slave device to signal an interrupt is to use an extra interrupt (INT) pin. The INT pin is not a part of the I²C specification, but is a workable interrupt solution for implementation on a large multitude of I²C slave devices. However, the extra INT pin undesirably adds to hardware complexity and increases interconnecting costs by increasing board space and pin count.

The communication network 100A of Conventional Art FIG. 1A illustrates the implementation of an INT input pin at the master device 110 for each INT output pin in the plurality of slave devices 130. For example, INT output pin 142A of slave device 140 is coupled to the INT input pin 142B at the master device 110 via a dedicated input line 145. The INT output pin 152A of slave device 150 is coupled to the INT input pin 152B via a dedicated input line 155. Also, INT output pin 162A of slave device 160 is coupled to the INT input pin 162B via a dedicated input line 165. As such, the master device 110 would comprise N INT input pins, one for each of the INT output pins on each of the N slave devices in the plurality of slave devices 130.

The number of input and output INT pins can quickly increase within the communication network 100A. A typical communication network 100A may have three slave devices within the plurality of slave devices 130. The additional three input pins in the master device 110 represents a significant cost increase. In addition, each of the plurality of slave devices have an additional INT pin that greatly adds to their fabrication cost, or, otherwise reduces the available pin count, and ultimately the flexibility of the chip.

Assuming all slave interrupt outputs are active low, an alternative solution is to wire-AND all the interrupts together in parallel so that the master device 110 would only need one INT input pin. Conventional Art FIG. 1B illustrates a communication network 100B illustrates the implementation of an AND module 190 for signaling an interrupt. Network 100B is similar to communication network 100A in structure, except for wire-ANDing the independent and dedicated interrupt lines 165, 155, and 145.

The master devices 110 must still utilize an extra INT input pin. Also, even though the wire-AND'ing of the interrupt lines coming from the plurality of slave devices greatly reduces the input INT pin count in the master device 110, there still is a fifty percent increase to the pin count (2 pins) of the normal I²C interface, with the dedicated INT input pin at the master device 110, and each of the plurality of slave devices.

Another problem associated with the Conventional Art communication network 100B, is the tedious discovery process for the master device 110 implemented to determine which slave device may have requested an interrupt signal. After the master device 110 recognizes that an interrupt has occurred, it must read the status register of all the slave devices (e.g., 140, 150, 160, etc.) attached to the master device 110 to determine which slave device or slave devices have sent an interrupt. Multiple devices may have signaled interrupts at the same time.

The discovery process is long and tedious because each slave must be addressed and sent a status register address. Also, the master device 110 must wait for the return by the slave device polled for the contents of their interrupt status register. The process can take a minimum of three bytes per peripheral slave device. For example, at currently defined speeds (e.g., 100 kb/s, 400 kb/s, 1 Mb/s, etc) over the I²C bus, performing a possible three (1 slave) to 384 bytes (128 slaves) can take a significant response time.

One alternative solution is illustrated in Conventional Art communication network 100A, by using separate and dedicated INT pins for each I²C interrupt-enabled slave device. However, having more than one INT pin dedicated to I²C slave devices defeats the purpose of using the simplistic and efficient two wire serial bus. Also, this alternative is expensive to support in terms of hardware cost.

SUMMARY OF THE INVENTION

Thus, a specific drawback to the interrupt signaling by conventional slave devices is the requirement of dedicated INT output pins in each of the plurality of slave devices, and one or more INT input pins on the master device. The additional pin counts in the master and slave devices adds to the fabrication complexity of the two wire bus compatible $I^2C$ devices, thereby increasing the cost of chip fabrication for each of those $I^2C$ devices, sacrificing hardware efficiency, increasing circuit complexity, and increasing interconnecting costs with the additional dedicated board space and pin counts needed.

Accordingly, various embodiments of the present invention disclose a method and system for interrupt signaling over a two wire serial bus communication interface. Embodiments of the present invention may eliminate the need for dedicated pins on master and slave devices for handling interrupt signaling between the master and the slave devices over the two wire serial bus. In addition, embodiments of the present invention may be fully compatible with legacy devices and may co-exist with the legacy device over a network providing communication over the two wire serial bus.

Specifically, embodiments of the present invention disclose a method and apparatus for interrupt signaling. A communication network is described comprising a master device and a slave device that are both coupled to a two wire serial bus for communication. The two wire serial bus comprises a serial data (SDA) line and a serial clock (SCL) line. The master device controls communication between the master device and the slave device.

The slave device is capable of generating an interrupt signal during an idle condition over the SDA line for requesting a communication transaction with the master device. This is accomplished by pulling the SDA line low to create a high to low transition over the SDA line during an idle condition on the two wire serial bus. The master device is able to recognize the high to low transition as an interrupt signal from the slave device. Thereafter, normal data transmission protocols are followed to conduct the communication transaction between the master device and the slave device.

A method is also described for recognizing an interrupt at the master device. During an idle condition over the two wire serial bus, the SDA line is typically high. During the idle condition, when the master device reads a transition from high to low over the SDA line, the master device recognizes the high to low transition as an interrupt signal from the slave device in a communication network. In a communication network having a plurality of slave devices, the master device may poll the plurality of slave devices in order to determine the source of the interrupt signal.

The interrupt signal is generated by the slave device requesting a communication transaction with the master device by pulling the SDA line low during the idle condition of the two wire serial bus. The master device takes control over the two wire serial bus by concurrently pulling the SDA line low thereby allowing the slave device to release the SDA line. Thereafter, the master device conducts the communication transaction for the transmission of data between the master device and the slave device.

After the communication transaction is complete, the master device then generates a stop condition over the two wire serial bus. The master device releases the SDA line which passively returns high. The master also generates at least one clock cycle over the serial clock line of the two wire serial bus to ensure proper notification of the stop condition to all slave devices coupled to the communication network. This process renders the idle condition over the two wire serial bus.

A method is also described for determining which slave device in a network generated an interrupt over an $I^2C$ communication bus. The communication network can contain a plurality of slave devices coupled to a master device over the $I^2C$ bus. The method includes assigning an interrupt identification number to each of the plurality of slave devices for identification purposes. The interrupt identification number can be a sequential number assigned to each of the plurality of slave devices. Also, the interrupt identification number is associated with a clock sequence number from 0 to 127 in the $I^2C$ standard protocol. For example, each of the plurality of slave devices is assigned a number from 0 to 127 for identification. That number is associated with a corresponding clock pulse in a sequence of clock pulses that runs from 1 to 128.

Upon receiving an interrupt signal, the master device responds by generating an interrupt broadcast address. The interrupt broadcast address can be assigned by the master device or can be a system wide default address. The master device follows the interrupt broadcast address with a READ bit.

Thereafter, any slave device with an interrupt to service will respond with an acknowledge (ACK) bit, by pulling down the SDA line. At this point, the master device has verified that a slave device has generated an interrupt signal and begins a clock sequence count. The clock sequence is from 1 to 128 for the 128 possible peripheral slave devices possible in an $I^2C$ communication network.

The slave device that generates an interrupt again pulls the SDA line low during the time when its interrupt identification number corresponds to its clock sequence number. Since there is a one-to-one association, the master can identify which slave device has pulled the SDA line low. Multiple slave devices that simultaneously generate an interrupt signal can positively be identified, since the slave devices is assigned a dedicated interrupt identification number that corresponds to a dedicated clock sequence number. As such, all slave devices that have generated an interrupt signal need only pull the SDA line low when their associated clock is sent during the clock sequence count.

BRIEF DESCRIPTION OF THE DRAWINGS

CONVENTIONAL ART

CONVENTIONAL ART

FIG. 8 is a flow diagram illustrating steps in a computer implemented method of generating an interrupt signal at a slave device over a two wire serial bus, in accordance with embodiments of the present invention.

DETAILED DESCRIPTION OF THE INVENTION

Figure 1A:
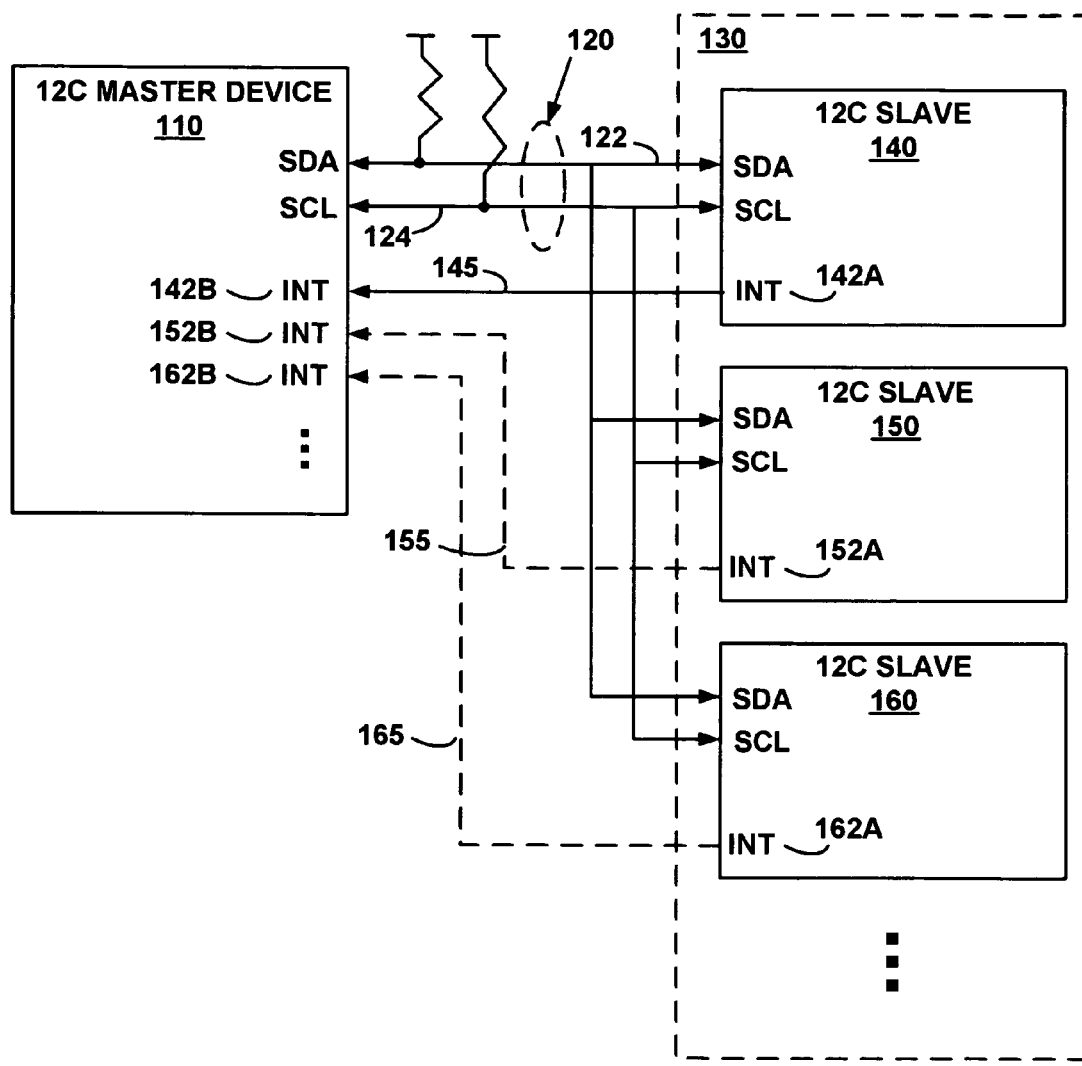
FIG. 1A is a block diagram of a communication network comprising a master device and a plurality of slave devices communicating over a two wire serial bus, wherein each of the master and slave devices have one or more dedicated interrupt pins.
Figure 1B:
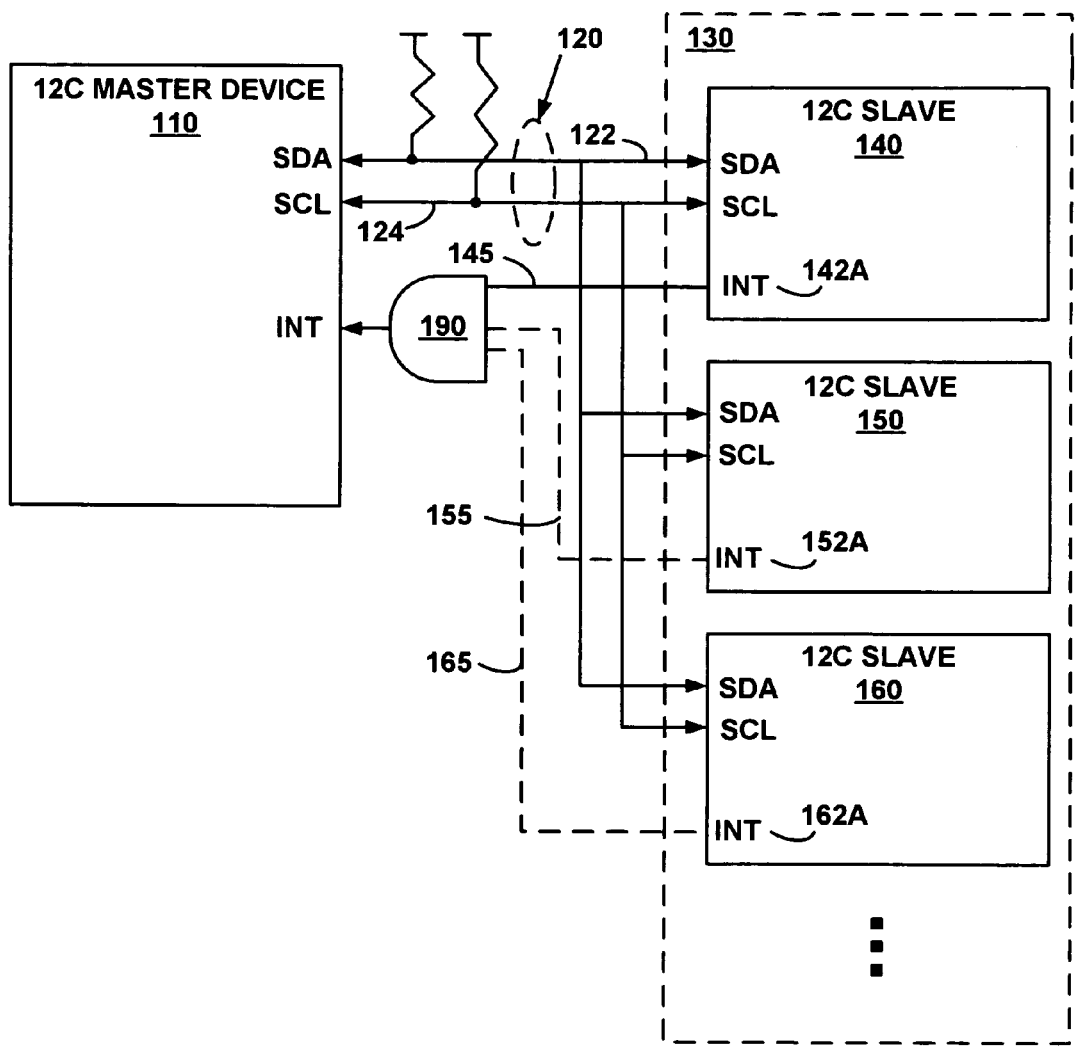
FIG. 1B illustrates a communication network implementing an AND module for signaling an interrupt.

Reference will now be made in detail to the preferred embodiments of the present invention, a method and apparatus for generating an interrupt signal by a slave device that is directed to a master device, over a two wire serial bus, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "pulling," "reading," "recognizing," "controlling," "conducting," "generating," "terminating," "polling," "asserting," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 2:
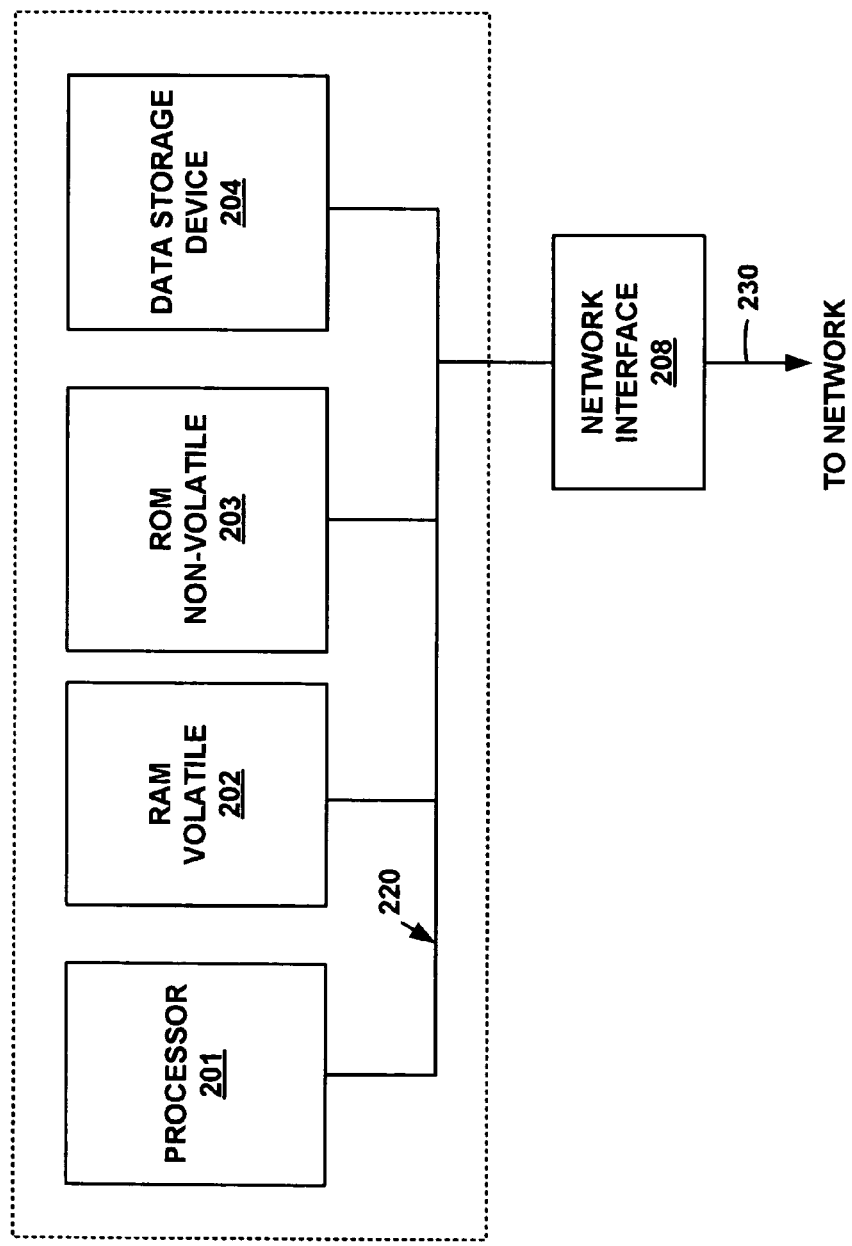
FIG. 2 is a logical block diagram of an exemplary two wire serial bus compatible device capable of interrupt signaling over the two wire serial bus, in accordance with one embodiment of the present invention.

Referring to FIG. 2, embodiments of the present invention are comprised of computer-readable and computer-executable instructions which reside, for example, in computer-readable media of an electronic device 200 that is compatible with a communication network implementing an interrupt signaling protocol over the serial data (SDL) line of a two wire serial bus. FIG. 2 is a block diagram of exemplary embedded components of the electronic device 200 that is compatible with the two wire serial bus upon which embodiments of the present invention may be implemented. Exemplary device 200 includes an internal address/data bus 220 for communicating information, a central processor 201 coupled with the bus 220 for processing information and instructions, a volatile memory 202 (e.g., random access memory (RAM), static RAM, dynamic RAM, etc.) coupled with the bus 220 for storing information and instructions for the central processor 201, and a non-volatile memory 203 (e.g., read only memory (ROM), programmable ROM, flash memory, EPROM, EEPROM, etc.) coupled to the bus 220 for storing static information and instructions for the processor 201.

Electronic device 200 may also include various forms of storage 204 for storing large amounts of information and instructions, as well as any other information that is required, coupled with the bus 220.

With reference still to FIG. 2, a network interface 208 is shown. In one embodiment, the network interface 208 is a signal Input/Output (I/O) device 208. The I/O device 208 is coupled to bus 220 for providing a communication link between electronic device 200 and other electronic devices compatible with the two wire serial bus (e.g., I²C bus). As such, signal I/O device 208 enables the central processor unit 201 to communicate with or monitor other electronic devices that are coupled to the electronic device 200.

The Input/Output device 208 could be an I/O interface that is associated with the bus 220. Data from the electronic device 200 travels through a port and onto an external bus 230 that is the two wire serial bus (e.g., I²C bus) that provides for data transfer between electronic devices in a communication network.

Generation of Interrupt Signals from Slave Devices Over a Two Wire Serial Bus Interface A method and apparatus are described for generating an interrupt signal at a slave device over a two wire serial bus interface in a communication network, in accordance with embodiments of the present invention. Although embodiments of the present invention are described within the context of a two wire serial bus that is substantially compliant with the I²C specification, other embodiments are well suited to implementation within other two wire serial bus interfaces.

Figure 3:
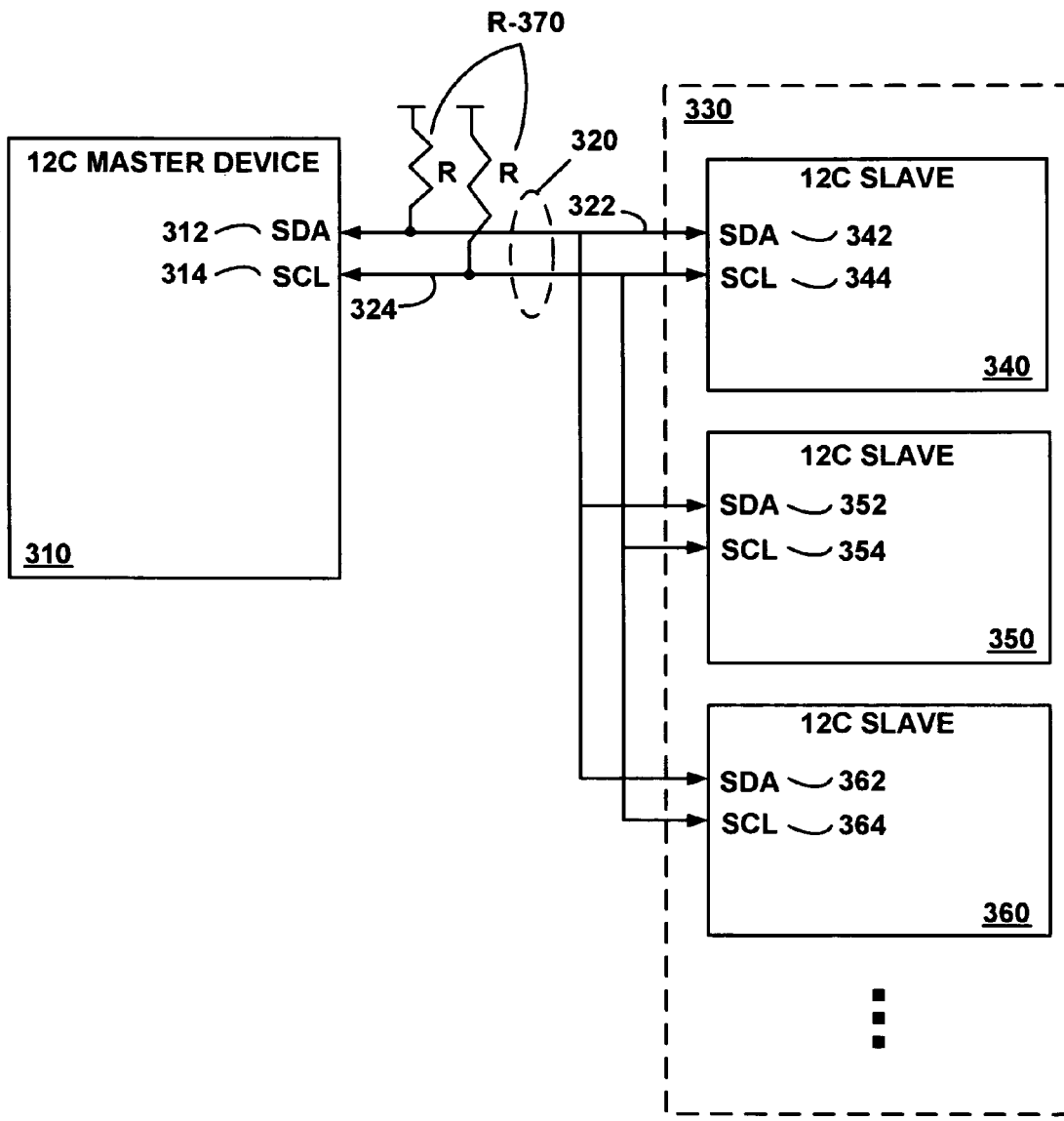
FIG. 3 is a block diagram of a communication network comprising a master device and a plurality of slave devices communicating over a two wire serial bus, wherein each of the slave devices are capable of interrupt signaling over the two wire serial bus, in accordance with embodiments of the present invention.

Referring now to FIG. 3, a block diagram is shown illustrating a communication network 300 that includes a plurality of slave devices 330, each of which is capable of generating an interrupt signal over the I²C bus 320 for requesting a communication transaction with a master device 310, in accordance with one embodiment of the present invention. The master device 310 controls communication over the I²C bus 320. The master device 310 and the plurality of slave devices 330 are coupled to the I²C bus 320. The plurality of slave devices 330 can be comprised of up to 128 slave devices, e.g., slave device 340, slave device 350, slave device 360, etc.

The two wire serial bus (e.g., I²C bus) can be comprised of a serial data (SDA) line 322 and a serial clock (SCL) line 324. The I²C bus uses open drain signaling so that multiple drivers on the I²C bus 320 will not cause problems when two or more devices attempt to communicate at the same time. The master device 310 and the plurality of slave devices 330 share a common set of pull up resistors R-370 on the SDA line 322 and the SCL line 324. The pull up resistors R-370 passively pull the SDA line 322 and the SCL line 324 high.

Through the use of additional signaling, an interrupt can be generated from any one of the plurality of slave devices 330 using the existing two wire I²C bus interface 320. More specifically, embodiments of the present invention are able to multiplex an interrupt signal over the data signal on the SDA line 322. As such, FIG. 3 illustrates that the master device 310 and each of the plurality of slave devices 330 only have two pins: one pin for the SDA line 322 and one pin for the SCL line 324. For example, the master device 310 comprises an SDA pin for transmitting and receiving data, and an SCL pin for sending out a clock signal.

Also, each of the plurality of slave devices 330 have an SDA pin for transmitting and receiving instructions or data, and an SCL pin for receiving a clock signal from the master device 310. For example, the slave device 340 includes an SDA line 342 and an SCL line 344, slave device 350 includes an SDA line 352 and an SCL line 354, slave device 360 includes an SDA line 362 and an SCL line 364, etc. Furthermore, each of the SDA pins located on the plurality of slave devices 330 are coupled in parallel to the SDA line 322. Moreover, each of the SCL pins located on the plurality of slave devices 330 are coupled in parallel to the SCL line 324.

In contrast to conventional electronic devices, each of the electronic devices in FIG. 3 lack a dedicated interrupt (INT) pin. Embodiments of the present invention are able to generate an interrupt signal at a slave device by multiplexing the interrupt signal over the existing two wire I²C serial bus architecture, and more specifically, by multiplexing the interrupt signal over a data signal on the SDA line 322.

Figure 4:
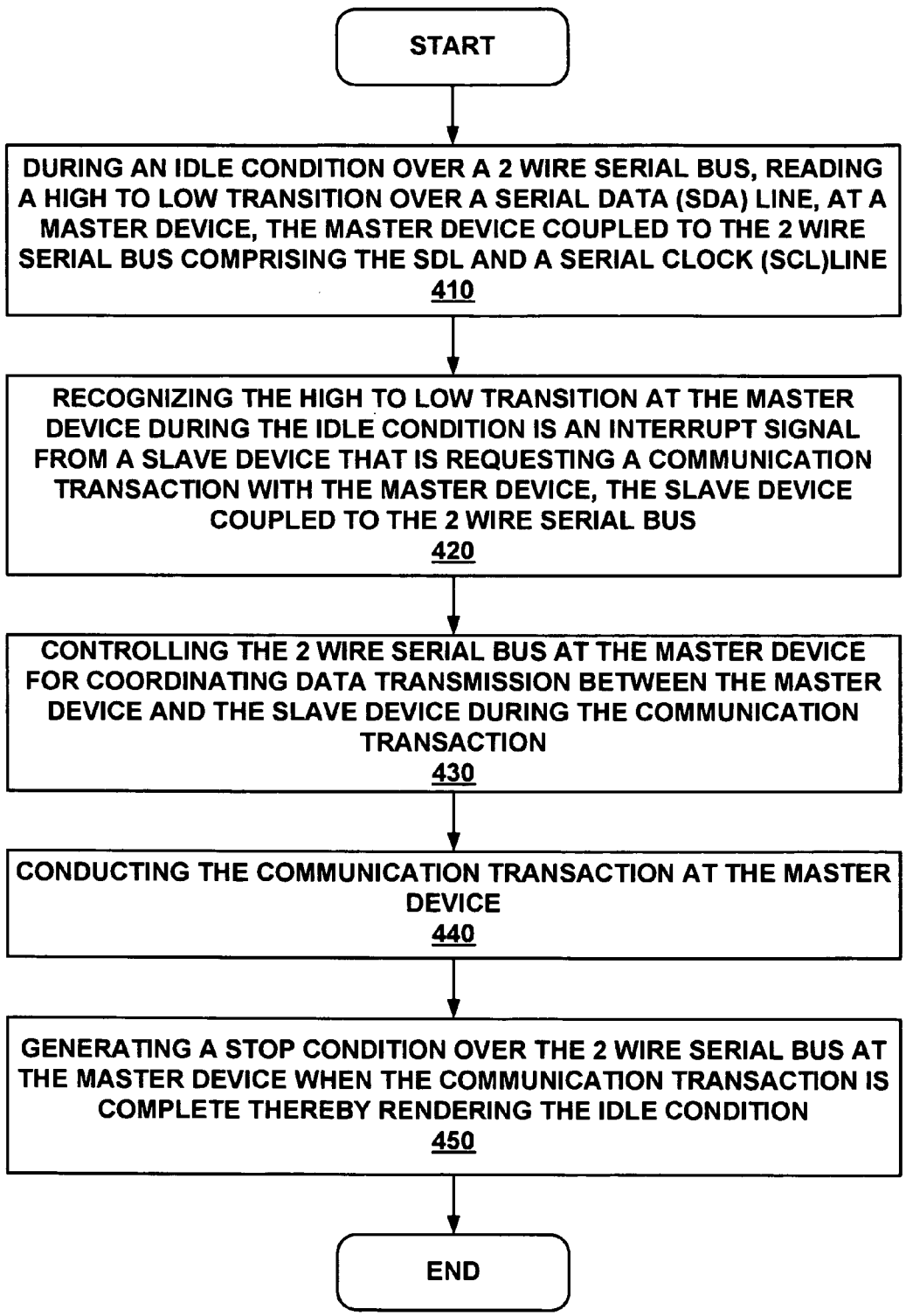
FIG. 4 is a flow diagram illustrating steps in a computer implemented method for coordinating a communication transaction between a master device and a slave device requesting a communication transaction with an interrupt signal over a two wire serial bus, in accordance with embodiments of the present invention.

FIG. 4 is a flow chart 400 illustrating steps in a computer implemented method for recognizing the generation of an interrupt signal from a slave device on a two wire serial bus (e.g., I²C bus) servicing a communication network comprising a master device and one or more slave devices, in accordance with one embodiment of the present invention. Although the present embodiment discloses the implementation of the method for generating an interrupt signal from the perspective of a master device, other embodiments are well suited to perspectives from the slave devices, and from the perspective of the entire communication network.

The present embodiment begins by reading a high to low transition over a SDA line, at a master device, in step 410. This high to low transition is read during an idle condition over the two wire serial bus (e.g., I²C bus). The master device is coupled to the two wire serial bus, which comprises the SDA line and an SCL line.

In step 420, the present embodiment recognizes that the high to low transition over the SDA line during the idle condition is an interrupt signal from a slave device. The slave device is requesting a communication transaction with the master device. The slave device is coupled to the two wire serial bus. Through the use of additional signaling, an interrupt can be generated from a slave device to a master device using the exiting two wire serial bus (e.g., I²C bus). In order to accomplish this, a slave device must be able to drive the SDA line low while the SCL line is idle (e.g., when the SCL line is high). If the master device generates this signaling sequence, then this is a start condition to a communcation transaction. However, if a slave device generates this sequence, then the master device can differentiate a start condition, which the master device can only generate, from an interrupt signal that is generated from a slave device.

Figure 6:
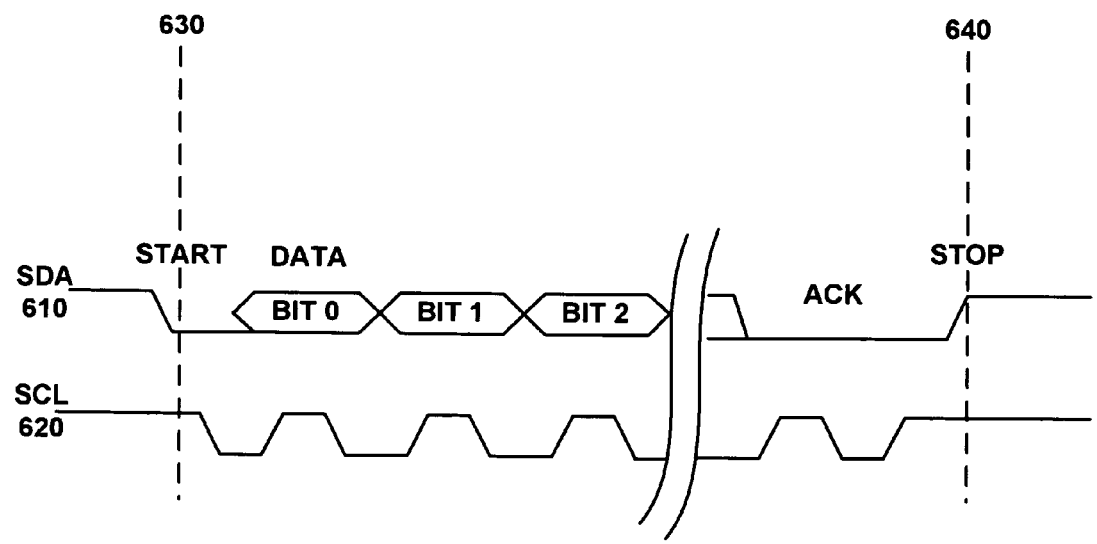
FIG. 6 is a signal diagram illustrating conditions of a serial data (SDA) line at the start of a typical I²C communication transaction, during the communication transaction, and at the end of the communication transaction, in accordance with embodiments of the present invention.

FIG. 6 is a signal diagram of the SDA line and the SCL line during a typical I²C communication transaction, in accordance with one embodiment of the present invention. During an idle condition over the I²C bus, the SDA line 610 is passively pulled high, an SDA high condition. When the SDA line 610 is pulled high, no data transmission occurs over the SDA line between the master device and a slave device in a plurality of slave devices.

More specifically, at the start of the idle condition, the SDA line 610 is left high by the master device when the clock signal is high on the SCL line 620 as shown at demarcation line 640. The master device may or may not continue to generate the clock signal over SCL line 620 during the idle condition. Typically, the SCL line 620 can be pulled high with no generation of a clock signal by the master device during the idle condition. For example, the idle condition, with the SCL line 620 pulled high and the SDA line 610 pulled high, is illustrated in FIG. 6 to the left of the demarcation line 630.

At the start of a typical communication transaction that is generated from the master device, the master device generates a start condition at demarcation line 630. The master device drives the SDA line 610 low from an SDA high condition to an SDA low condition. This creates a high to low transition over the SDA line 610 while the SCL line 620 is high.

At the start of the communication transaction, the master device generates a clock signal over the SCL line 620. As shown in FIG. 6, the clock signal cycles from high to low to the right of the demarcation line 630 to define the rate of data transfer during the communication transaction between the master device and a slave device.

The period of data transmission during the communication transaction occurs between demarcation line 630 and demarcation line 640. During the period of data transmission, the SDA line 610 is driven low by the master device. This effectively notifies electronic devices on the I²C bus that a communication transaction is occurring over the SDA line 610. During the communication transaction, the master device controls the flow of data transmission between the master and the slave device. During the period of data transmission, the slave device may also drive the SDA line 610, but only does so after being addressed by the master device and after an input request.

After the communication transaction is complete, a stop condition is generated by the master device over the SDA line 610 to notify all electronic devices coupled to the I²C bus that the SDA line is open for data transmission. The demarcation line 640 illustrates the stop condition for a typical I²C communication transaction. At the end of the communication transaction, the master device releases the SDA line 610 while the clock signal is high on the SCL line 620. At that point, the two wire serial bus, SDA line 610 and SCL line 620, is in an idle condition.

Returning to FIG. 4, the present embodiment, at the master device, recognizes the high to low transition over the SDA line during an idle condition on the two wire serial bus is an interrupt signal from a slave device, in step 420. Since the master device typically controls the SDA line, when a high to low transition occurs, that is not driven by the master device, during an idle condition (e.g., when SCL is high), the master device is able to recognize the high to low transition as an interrupt signal generated from a slave device that is coupled to the I²C bus interface.

The slave device generates the interrupt signal for the purpose of requesting a communication transaction with the master device. The slave device may have need to contact the master device upon an asynchronous event for the purpose of transferring data (e.g., upon the completion of a task, or to notify the master device when a buffer is full or empty, etc.). The slave device is coupled to the two wire serial bus (e.g., I²C bus).

In step 430, the present embodiment controls the two wire serial bus (e.g., I²C bus) at the master device for coordinating data transmission between the master device and the slave device during the communication transaction. Details of this process are disclosed in FIG. 5.

In step 440, the present embodiment conducts the communication transaction for the purpose of transferring data between the master device and the slave device. The normal I²C protocol can be used by the master and slave devices for conducting the communication transaction. Similarly, at this time, normal I²C protocol can be used by the master device to locate the slave device, the source of the interrupt signal, in a communication network comprising a plurality of slave devices coupled to the two wire serial bus (e.g., I²C bus).

In step 450, the present embodiment generates a stop condition over the two wire serial bus (e.g., I²C bus) at the master device when the communication transaction is complete. The stop condition notifies the electronic device coupled to the two wire serial bus that the communication transaction is over and that the SDA line is open for other data transmission. Details of this process are disclosed in FIG. 5.

Figure 5:
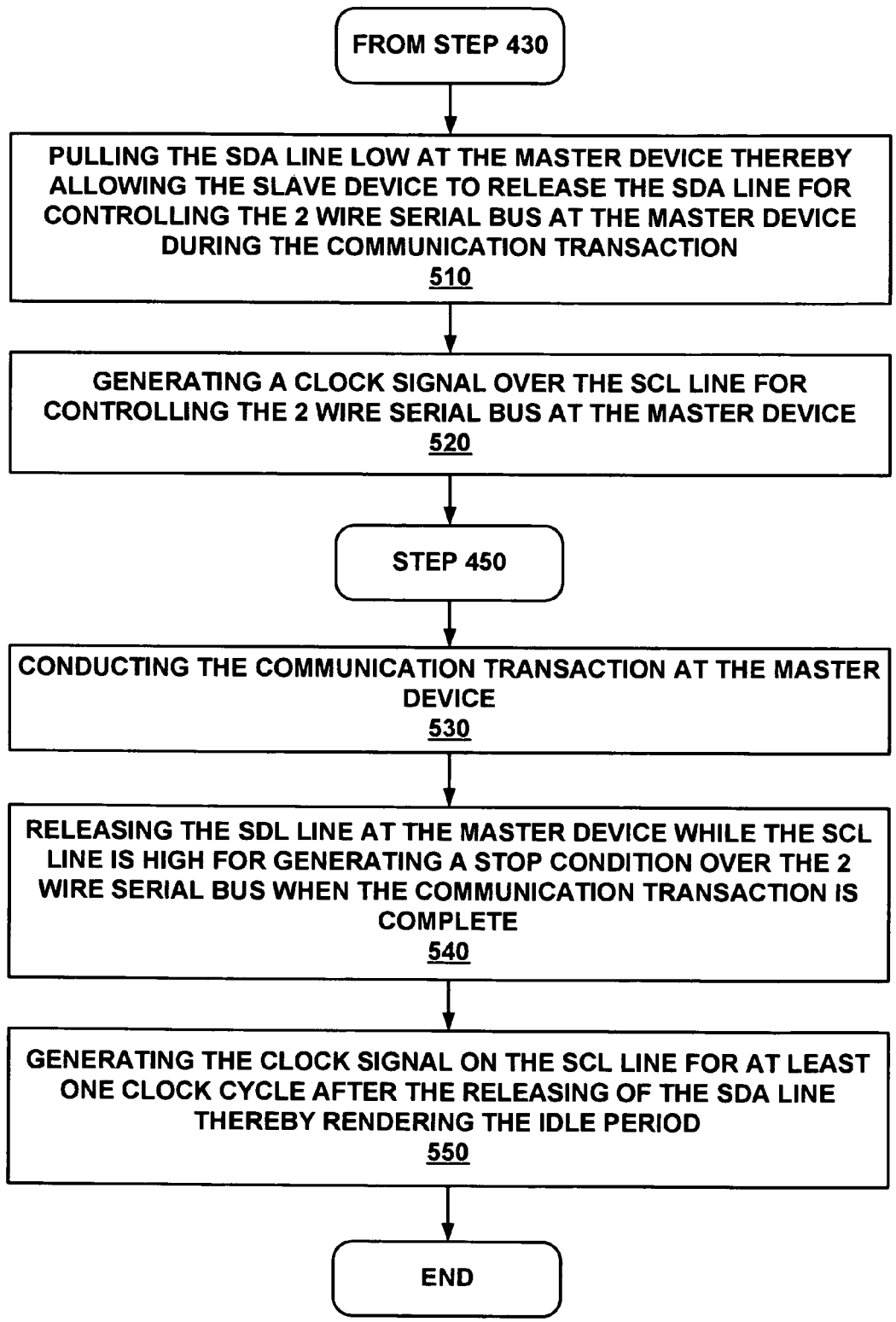
FIG. 5 is a flow diagram illustrating steps in a computer implemented method for initiating a start condition and stop condition over a two wire serial bus for a communication transaction between a master device and a slave device requesting the communication transaction, in accordance with embodiments of the present invention.

FIG. 5 is a flow chart 500 illustrating steps in a method for generating a start and stop condition after slave interrupt signaling over a two wire serial bus (e.g., I²C) for a communication transaction between a master device and a slave device, in accordance with one embodiment of the present invention. The flow chart 500 is an extension of the flow chart 400 of FIG. 4. The present embodiment begins from step 430 of flow chart 400 for controlling the two wire serial bus at the master device for coordinating data transmission between the master device and the slave device during the communication transaction.

In step 510, the present embodiment pulls the SDA line low, an SDA low condition, at the master device. This is accomplished by driving the SDA line low by the master device thereby allowing the slave device to release the SDA line. Previously, the SDA line was driven low by the slave device to generate an interrupt signal during an idle condition over the two wire serial bus. The SDA line remains in an SDA low condition, but is now controlled by the master device. As such, the slave device can relinquish control over the SDA line as soon as the slave recognizes the SCL line is driven low by the master, and allow the normal I²C protocol to take over for the purposes of data transmission between the master and the slave device.

Figure 7:
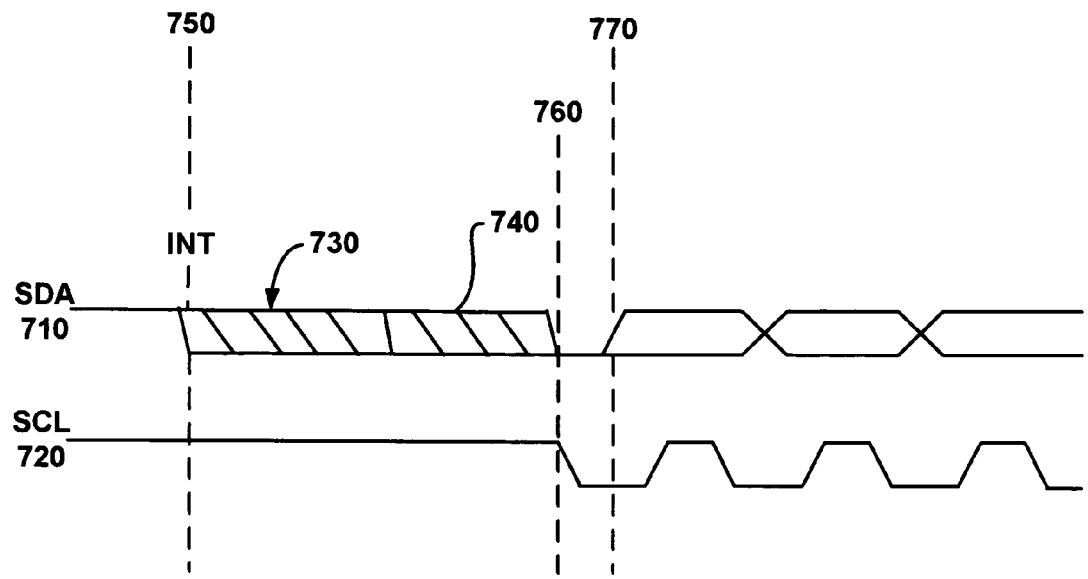
FIG. 7 is a signal diagram illustrating conditions of a SDA line when a slave device is sending an interrupt signal to a master device over a two wire serial bus for indicating a start condition of a communication transaction, in accordance with embodiments of the present invention.

FIG. 7 is a signal diagram 700 illustrating the generation of an interrupt signal by a slave device for the purpose of requesting a communication transaction with the master device. During an idle condition over the I²C bus, the SDA line 710 is passively pulled high when the SCL line 720 is also high, and the SDA line 710 remains high, an SDA high condition. When the SCL line 720 is pulled high, no data transmission occurs over the SDA line 710 between the master device and a slave device in a plurality of slave devices. The idle condition is illustrated to the left of the demarcation line 750 and comprises the SDA line 710 pulled high and the SCL line 720 pulled high.

To the right of the demarcation line 750, a slave device initiates an interrupt signal by driving the SDA line 710 low, an SDA low condition. This occurs while the SCL line 720 is high, an SCL high condition. This is illustrated by region 730 in FIG. 7. At this point, the master device recognizes that the transition from high to low over the SDA line 710 during the idle condition (e.g., when the SCL line 720 is high) is an interrupt signal from one of a plurality of slave devices coupled to the two wire serial bus (e.g., I²C bus).

For normal I²C data transmission protocol, the master device controls the two wire serial bus. As such, the master device takes over control of the SDA line 710 by concurrently driving the SDA line 710 low while the slave device is also driving the SDA line 710 low. In region 740, the SDA line 710 is driven low by the master and the slave devices. The SCL line 720 remains high.

Returning back to FIG. 5, the present embodiment generates a clock signal over the SCL line for controlling the two wire serial bus (e.g., I²C bus) at the master device, in step 520. This starts the communication transaction between the master device and the slave device requesting the communication transaction. The start is generated in the present embodiment when the SDA line is driven low by the master device. After the master device drives the SCL line low, the slave device releases the SDA line to the sole control of the master device. Demarcation line 760 illustrates the start of the communication transaction between the master device and the slave device.

Since the communication transaction is a result of an interrupt signal from a slave device, the master device may choose when to proceed with the data transmission between the master device and the slave device. The master device may choose to immediately proceed with data transmission, or suspend the data transmission until the completion of a separate task. To the right of demarcation line 770 transition states of the SDA line are shown. At these points, the state of the SDA line can change from high to low, or low to high, in compliance with the I²C standard.

The two wire serial bus is not in an idle state since the master device released the SDA line 710 when the SCL line 720 is low. As such, the master device, as well as all the devices coupled to the two wire serial bus in the communication network understand that the communication transaction between the master and the slave device has not been completed. At a subsequent period, the master device may again pull the SDA line 710 low for the purpose of conducting or completing the data transmission during the communication transaction between the master device and the slave device requesting the communication transaction.

In a communication network with only one slave device, the master device logically understands that the interrupt signal must have originated from that single slave device. However, in a communication network comprising a plurality of slave devices, the master device must attempt to locate the source of the interrupt signal. In one embodiment, the master device can poll each of the plurality of slave devices to locate the source of the interrupt signal.

In addition, if an interrupt causing slave device detects that a master device has started another communication transaction after the generation of the interrupt signal over the SDA line, but its interrupt signal has not been recognized by the master device, then the slave device can signal another interrupt signal over the SDA line after the master device completes its communication transaction.

From step 530, the present embodiment proceeds to step 450 in FIG. 4 to generate a stop condition over the two wire serial bus when the communication transaction is complete, thereby rendering the idle condition. From step 450, the present embodiment proceeds to step 540 to generate the stop condition. The present embodiment releases the SDA line at the master device when the clock signal is high on the SCL line. Since the SDA line is an open drain signaling line, the SDA line is passively pulled high, an SDA high condition.

If an interrupt enabled slave device generates an SDA interrupt signal before all the other slave devices have time to recognize the stop condition, some of the slave devices may not recognize that a stop condition to the previous communication transaction has occurred. These devices will not recognize the idle condition. Since these devices think that a communication transaction is still occurring, when in fact it has been completed, those devices are effectively prohibited from generating an interrupt signal.

To ensure that the slave devices coupled to the two wire serial bus will have recognized the stop condition generated by the master device, the present embodiment then proceeds to step 550 to generate a clock signal on the SCL line for at least one clock cycle after releasing the SDA line. An idle condition is rendered since a low to high transition on the SDA line occurs when the SCL line is high. By generating at least one more clock cycle, this ensures that any slave device coupled to and clocked off the SCL line on the I²C bus has been updated with the latest bus status.

FIG. 8 is a flow chart 800 illustrating steps in a computer implemented method for recognizing the generation of an interrupt signal from a slave device on a two wire serial bus (e.g., I²C bus) servicing a communication network comprising a master device and one or more slave devices, in accordance with one embodiment of the present invention. The present embodiment discloses the implementation of the method for generating an interrupt signal from the perspective of the communication network.

The present embodiment begins by generating a high to low transition over a serial data (SDA) line during an idle condition on the SDA line at a slave device coupled to a two wire serial bus used for communicating over the communication network, in step 810. The slave device asserts the SDA line to generate the high to low transition. The two wire serial bus (e.g., an I²C bus) comprises the SDA line and a serial clock (SCL) line.

The idle condition on the SDA line, as discussed previously, occurs after a stop condition over the two wire serial bus, when a low to high transition occurs over the SDA line while the SCL line is high. Thereafter, the SDA line remains high during the idle condition.

In step 820, the present embodiment, at a master device, recognizes that the high to low transition during the idle condition is an interrupt signal from the slave device. The purpose of the interrupt signal is for starting a communication transaction between the master device and the slave device. The master device is coupled to the two wire serial bus.

In step 830, the master device takes over control over the two wire serial bus for coordinating data transmission between the master device and the slave device during the communication transaction.

In step 840, the master device starts the communication transaction in response to the interrupt signal. As discussed previously, the master device pulls the SDA line low concurrently with the slave device pulling the SDA line low. This allows the slave device to release the SDA line so that the master device can control the two wire serial bus and the communication transaction. This occurs while a serial clock line remains in an idle state (e.g., SCL line high), in one embodiment.

In addition, a clock signal is generated over the SCL line. At this point, communication starts over the two wire serial bus between the master device and the slave device requesting the communication transaction.

In step 850, the master device conducts the communication transaction following the normal data transmission protocol of the two wire interface (e.g., I²C bus). Data, instructions, and information can be transmitted over the SDA line from the master device to the slave device, and from the slave device to the master device.

In step 860 the master device generates a stop condition when the communication transaction is complete. This renders the idle condition over the two wire serial bus. The stop condition is generated by the master device by releasing the SDA line at the master device while the SCL line is high (e.g., when the clock cycle is high on the SCL line). To ensure that the devices on the two wire serial bus are notified of the stop condition, the master device generates at least one more clock cycle over the SCL line after releasing SDA line when generating the stop condition.

Figure 9:
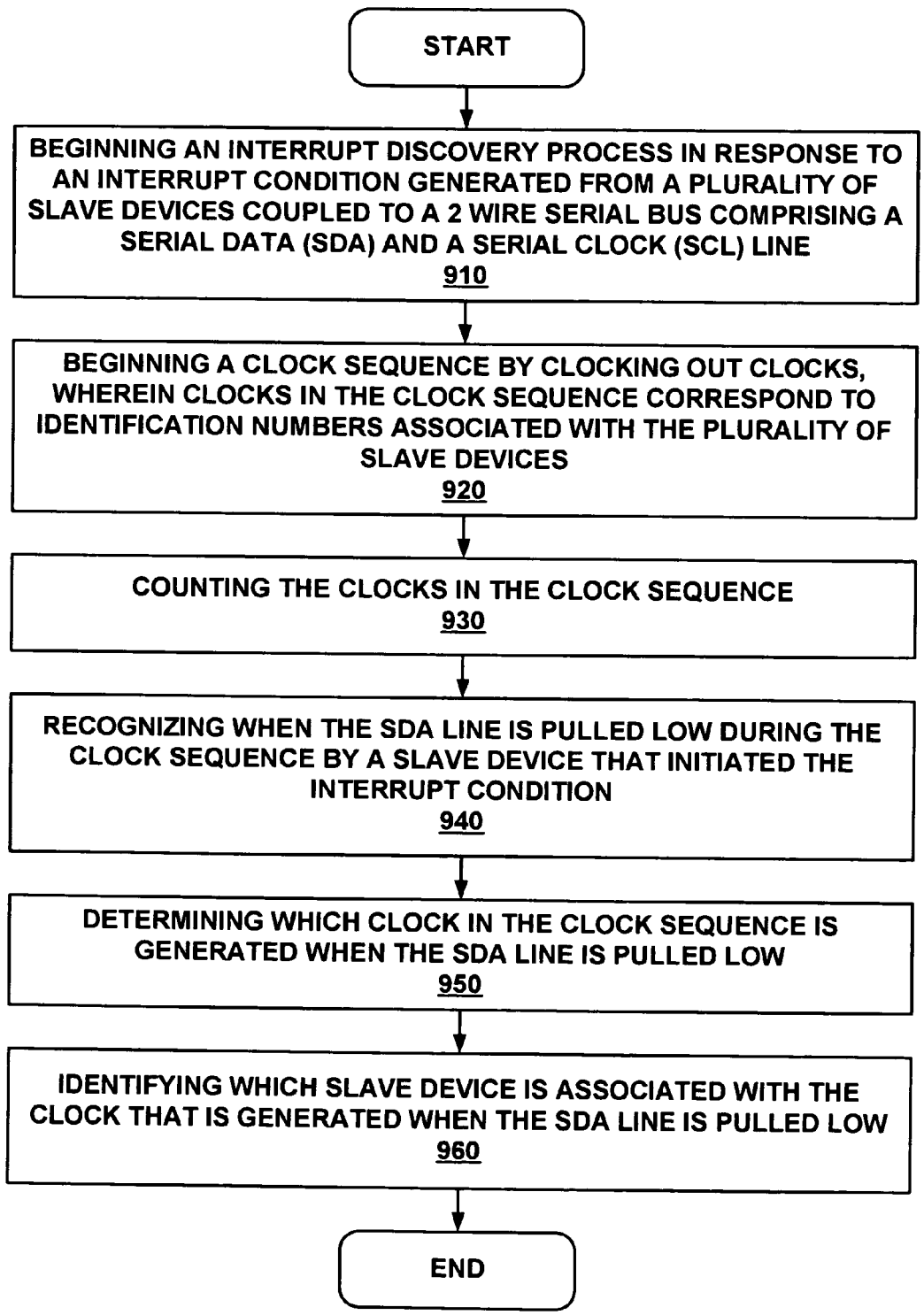
FIG. 9 is a flow diagram illustrating steps in a computer implemented method for determining which slave device or devices in a plurality of slave devices have generated the interrupt signal, in accordance with embodiments of the present invention.

FIG. 9 is a flow chart 900 illustrating steps in a computer implemented method for determining which slave device or devices have generated an interrupt signal over a two wire serial bus (e.g., I²C bus) servicing a communication network comprising a maser devices and a plurality of slave devices, in accordance with one embodiment of the present invention. The communication network can be one as illustrated in FIG. 3 or can be any network without individually dedicated interrupt lines for each of the plurality of slave devices.

The present embodiment begins by beginning an interrupt discovery process in step 910. After one or more slave devices signals an interrupt condition, the master device responds with an interrupt discovery process to find which slave device or devices initiated or generated the interrupt condition. The interrupt condition is generated over a two wire serial bus that comprises an SDA line and an SCL line.

The present embodiment begins the interrupt discovery process by generating an interrupt broadcast address on the SDA line. In addition, following standard $I^2C$ procedures, a READ bit follows the interrupt broadcast address in the first byte.

Figure 10:
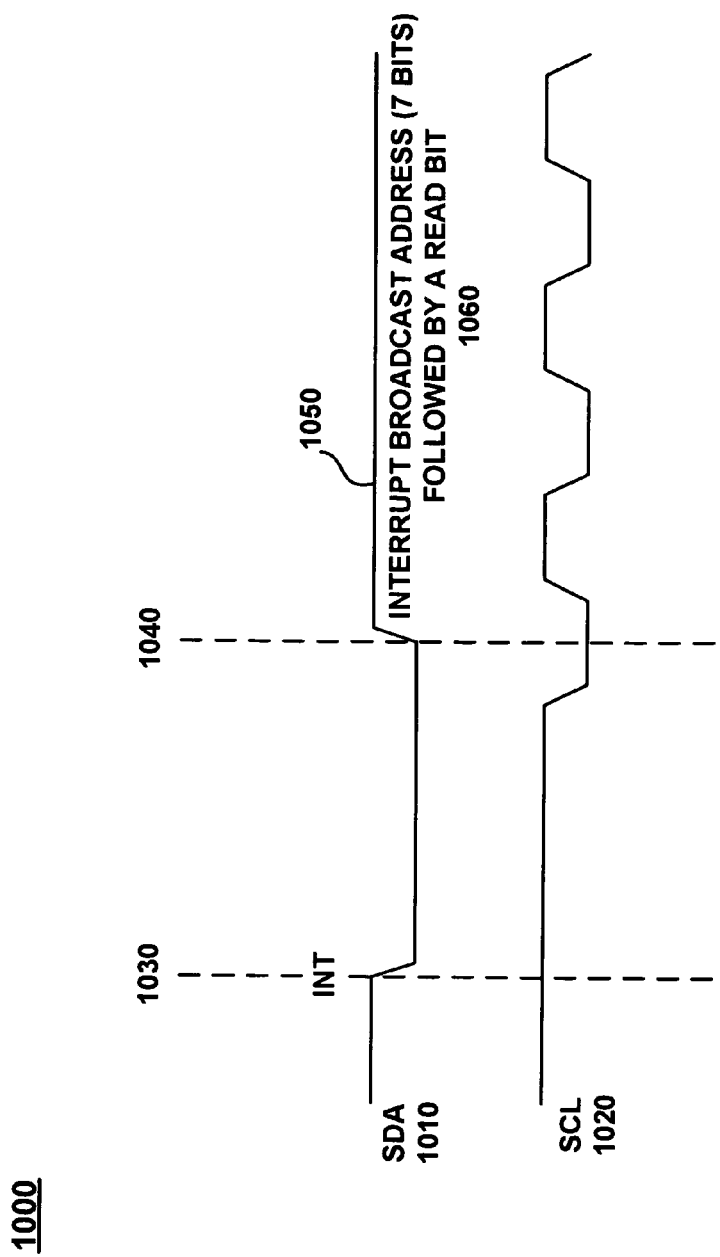
FIG. 10 is a signal diagram illustrating conditions of a serial data (SDA) line when staring an interrupt discovery process to find which slave device has generated an interrupt signal, in accordance with embodiments of the present invention.

FIG. 10 is a signal diagram 1000 of the SDA line 1010 and the SCL line 1020 during the start of the interrupt discovery process, in accordance with one embodiment of the present invention. Dotted line 1030 indicates the start of the interrupt signal from one or more slave devices. After the end of the interrupt signal, the master device drives the interrupt broadcast address 1050 (seven bits) and a final READ bit 1060 as the first byte. The eighth bit of the first address byte is released high by the master device to indicate that the transaction is a READ operation. This occurs on the SDA line 1010 to the right of the line 1040.

The interrupt broadcast address can be assigned by the master device, in one embodiment. As such, the master device writes the assigned interrupt broadcast address into an optional interrupt broadcast address register at each of the slave devices that are coupled to the master device over the two wire serial bus. In another embodiment, the interrupt broadcast address has a default address that is known to all the slave devices.

Figure 11:
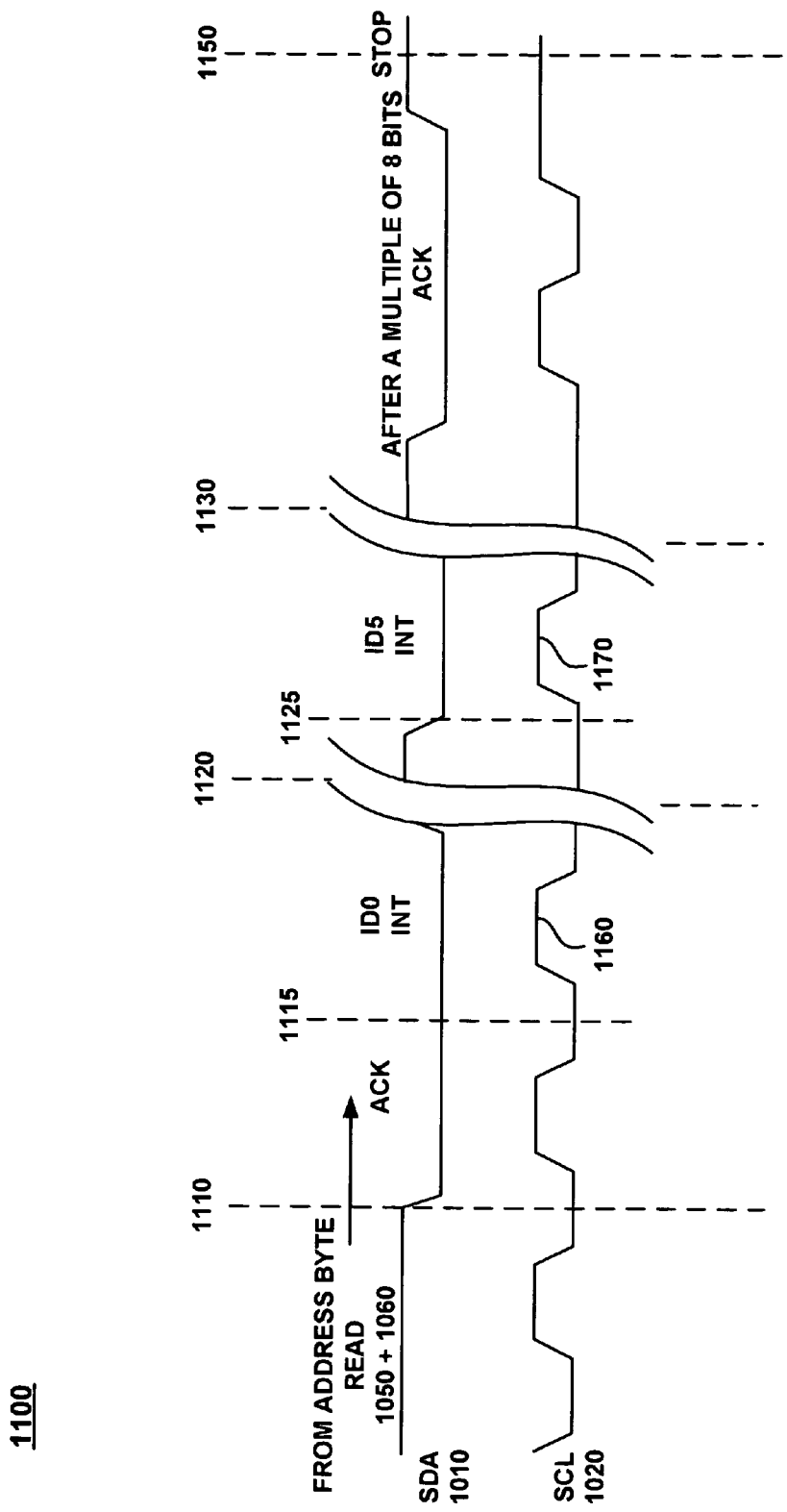
FIG. 11 is a signal diagram illustrating conditions of a SDA line during a clock sequence count when a slave device that has generated an interrupt signal identifies itself, in accordance with embodiments of the present invention.

FIG. 11 is a signal diagram 1100 of the SDA line 1010 and the SCL line 1020 after the start of the interrupt discovery process of FIG. 10. Each interrupt enabled slave device in the plurality of slave devices knows to respond to the interrupt broadcast address if it has an interrupt source to be processed.

Any device that has an interrupt condition should drive the acknowledge (ACK) bit after the interrupt broadcast address 1050 and READ bit 1060. Following line 1110, and ACK bit is asserted by a slave device. The ACK bit is asserted by the slave device by pulling the SDA line low, in one embodiment.

If no slave devices pull down the SDA signal during the ACK phase, then the ACK bit is not asserted. As such, the master device considers the interrupt condition to be a bus error and the transfer of data is stopped, in one embodiment.

At this point, the master device is attempting to determining which slave device or devices have requested interrupt service. One or more slave devices can signal an interrupt condition, since more than one slave device can simultaneously generate an interrupt signal. Returning back to flow chart 900, a clock sequence is generated by clocking out clocks at the master device, in step 920. The clock sequence begins with the first clock 1160 at line 1115 on the SCL line 1020. In step 930, the master device counts the clocks in the clock sequence.

The serial bits clocked by the master device represent interrupt identification numbers. Each slave device is associated with an interrupt identification number. The master device assigns an interrupt identification number to each of the slave devices in order to identify each slave device. In addition, the master device assigns a clock number in a sequence of clock numbers to each of the interrupt identification numbers. There is a one-to-one correspondence between a slave device, an interrupt identification number, and a clock sequence number. In one embodiment, the interrupt identification numbers are sequentially numbered from 0 to 127, and the clocks are sequentially numbered from 1 to 128.

In step 940, the present embodiment recognizes when the SDA line is pulled low during said clock sequence. Each of the slave devices are also following the clock sequence and counting out clocks in the clock sequence. A particular slave device that has generated the interrupt condition identifies itself by waiting for its associated clock (or, clock sequence number) in the clock sequence. At that time the particular slave device pulls the SDA line low.

In step 950, the present embodiment determines which clock sequence number (clock) in the clock sequence is generated when the SDA line is pulled low. Since there is a one-to-one correspondence between a slave device, an interrupt identification number, and a clock sequence number, the slave device can be identified by the master device, since it knows the clock sequence number.

In step 960, the present embodiment identifies which slave device is associated with the clock that is generated when the SDA line is pulled low in step 950. For instance, if a slave device that is causing the interrupt condition is assigned an interrupt identification number (ID#) of '0' by the master device, then the slave device (ID# 0) pulls the SDA line low at the first clock 1160, during the data phase of the interrupt discovery. At line 1115, the first clock 1160 is generated.

If another device with an assigned interrupt identification number of five (ID# 5) is also trying to signal an interrupt, then the sixth bit (the SDA line 1010) is pulled low as well at the sixth clock 1170 At that time, the SDA line is also pulled low by the slave device (0). At line 1125, the sixth clock 1170 is generated.

When all possible bits corresponding to valid interrupt ID#s are clocked out, the master device generates an ACK to the right of line 1130. A STOP condition to the right of line 1150 is also generated, in accordance with previous discussions. The STOP condition also provides a means for the master device to stop the bus without enabling interrupts as might be necessary between accesses while the master device prepares the next transfer but does not want interrupts enabled.

In one embodiment, the number of bits clocked out is rounded up to the nearest multiple of eight for backward compatibility and $I^2C$ compliance. Also, after clocking out a multiple of eight bits in the clock sequence, the master device signals an ACK to inform the slave devices to continue with the interrupt discovery process, in one embodiment. The clock associated with the ACK is not part of the clock sequence.

The method for determining which slave device or slave devices as disclosed in FIG. 9 is a much faster process than polling each slave device. In addition, the method lowers pin counts because the master device does not require a dedicated interrupt pin, for each interrupt enabled slave device. In addition, the method in flow chart 900 is compatible with current $I^2C$ standards and is backward compatible with implementations of legacy devices. The discovery time is significantly lowered as more and more peripheral slave devices are added to the network serviced by a two wire serial bus.

The present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

The program steps used to implement the embodiments described above can be implemented using disc storage as well as other forms of storage including Read Only Memory (ROM) devices, Random access Memory (RAM) devices; optical storage elements, magnetic storage elements, magneto-optimal storage elements, flash memory, core memory and/or other equivalent storage technologies without departing from the present invention. Such alternative storage devices should be considered equivalents.

While the methods of embodiments illustrated in flow charts 500, 600, 800, and 900 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

Embodiments of the present invention, generating an interrupt signal at a slave device over a two wire serial bus interface, is thus described. While the present invention has been described in particular embodiments, it should be appreciated that the present invention should not be construed as limited by such embodiments, but rather construed according to the below claims.

What is claimed is:

1. A communication network comprising:
    a serial bus for communication and comprising a serial data (SDA) line and a serial clock (SCL) line;
    a master device coupled to said serial bus for controlling said communication;
    a slave device coupled to said serial bus and generating an interrupt signal during an idle condition by pulling said SDA line low for initiating and requesting said communication between said master device and said slave device, and wherein said master device takes control of said communication by pulling said SDA line low concurrently while said slave device also pulls said SDA line low, thereby allowing said slave device to subsequently release said SDA line.

2. The communication network as described in claim 1, further comprising:
    a plurality of slave devices coupled to said serial bus, each capable of generating said interrupt signal during said idle condition for requesting a plurality of communications with said master device.

3. The communication network as described in claim 1, wherein said idle condition is signaled when said SDA line is pulled high when said SCL line is high, and said SDA line remaining high.

4. The communication network as described in claim 1, wherein said interrupt signal comprises a high to low transition over said SDA line, said SDA line pulled low by said slave device.

5. The communication network as described in claim 1, wherein said SDA line and said SCL line comprise open drain lines that are passively driven high.

6. The communication network as described in claim 1, wherein said communication is for data transmission between said master device and said slave device, said SDA line being pulled low by said master device during said communication, and further comprising a stop condition generated by said master device after completion of said communication between said master device and said slave device, said stop condition rendering said idle condition and signaled by said SDA line being pulled high, when said SCL line is high, by releasing said SDA line by said master device, said SDA line high for at least one clock cycle in a clock signal generated by said master device over a serial clock line in said serial bus.

7. The communication network as described in claim 1, wherein said serial bus complies with the $I^2C$ specification.

8. A method of interrupt signaling comprising:
    a) during an idle condition over a two wire serial bus, detecting a high to low transition on a serial data (SDA) line at a master device, said master device coupled to said two wire serial bus, which comprises said SDA line and a serial clock (SCL) line; and
    b) recognizing said high to low transition on said SDA line as an interrupt signal from a slave device requesting a communication transaction with said master device, said slave device coupled to said two wire serial bus;
    c) controlling said two wire serial bus at said master device for coordinating data transmission between said master device and said slave device during said communication transaction by pulling said SDA line low at said master device concurrently while said slave device also pulls said SDA line low when generating said interrupt signal, thereby allowing said slave device to subsequently release said SDA line.

9. The method as described in claim 8, wherein no data transmission occurs over said SDA line during said idle condition, said idle condition comprising an SDA high condition, wherein said SDA line is high.

10. The method as described in claim 8, further comprising generating said interrupt signal at said slave device by pulling said SDA line low during said idle condition.

11. The method as described in claim 8, wherein said controlling said two wire seial bus at said master device further comprises:
    b1) starting said communication transaction;
    b2 conducting said communication transaction at said master device; and
    b3) generating a stop condition over said two wire serial bus at said master device when said communication transaction is complete thereby rendering said idle condition.

12. The method as described in claim 8, wherein said controlling said two wire serial bus at said master device further comprises:
    generating a clock signal over said SCL line.

13. The method as described in claim 11, wherein b3) further comprises:
    i) releasing said SDA line at said master device; and
    ii) generating said clock signal on said SCL line for at least one clock cycle after said releasing said SDA line in i).

14. The method as described in claim 8, further comprising polling a plurality of slave devices that are coupled to said two wire serial bus to locate which slave device pulled said SDA line low to generate said interrupt signal.

15. A method of interrupt signaling in a communication network comprising:
    a) generating a high to low transition over a serial data (SDA) line during an idle condition on said SDA line by asserting said SDA line at a slave device, said slave device coupled to a two wire serial bus comprising said SDA line and a serial clock (SCL) line; and b) recognizing said high to low transition at a master device as an interrupt signal, said master device coupled to said two wire serial bus, and said interrupt signal for requesting a communication transaction between said master device and said slave device;

c) controlling said two wire serial bus at said master device for coordinating data transmission between said master device and said slave device during said communication transaction by pulling said SDA line low at said master device concurrently while said slave device also pulls said SDA line low when generating said interrupt signal, thereby allowing said slave device to subsequently release said SDA line.

16. The method as described in claim 15, wherein a) comprises said slave device pulling said SDA line low during said idle condition, and wherein no data transmission occurs over said SDA line during said idle condition.

17. The method as described in claim 15, wherein said controlling said two wire serial bus at said master device further comprises:
   b1) starting said communication transaction at said master device;
   b2) conducting said communication transaction at said master device; and
   b3) generating a stop condition at said master device when said communication transaction is complete thereby rendering said idle condition.

18. The method as described in claim 15, wherein said controlling said two wire serial bus at said master device further comprises:
   generating a clock signal over said SCL line; and
   releasing said SDA line at said slave device.

19. The method as described in claim 17, wherein b3) comprises:
   releasing said SDA line at said master device; and
   generating said clock signal on said SCL line for at least one clock cycle after said releasing said SDA line.

20. The method of interrupt signaling as described in claim 15, further comprising:
   reasserting said SDA line when said master device has started a second communication transaction with a second slave device before said master device has recognized said asserting said SDA line in a).

21. A method of interrupt discovery comprising:
   detecting a high to low transition on a serial data (SDA) at a master device and recognizing said high to low transition as an interrupt signal from a slave device requesting communication with said master device, said slave device coupled to said two wire serial bus;
   controlling said two wire serial bus at said master device for coordinating data transmission between said master device and said slave device by pulling said SDA line low at said master device concurrently while said slave device also pulls said SDA line low when generating said interrupt signal, thereby allowing said slave device to subsequently release said SDA line;
   beginning an interrupt discovery process in response to an interrupt condition that is generated from one of a plurality of slave devices over a serial data (SDA) line of a two wire serial bus to initiate a communication transaction between a slave device and a master device, said two wire serial bus comprising said SDA line and a serial clock (SCL) line;
   beginning a clock sequence by clocking out clocks, wherein clocks in said clock sequence correspond to identification numbers associated with said plurality of slave devices;
   sequentially counting said clocks in said clock sequence;
   recognizing when said SDA line is pulled low during said clock sequence by said slave device that initiated said interrupt condition;
   determining which clock in said clock sequence is generated when said SDA line is pulled low; and
   identifying which slave device is associated with said clock that is generated in e) when said SDA line is pulled low.

22. The method as described in claim 21, wherein said beginning an interrupt discovery process comprises:
   generating an interrupt broadcast address over said SDA line; and
   generating a READ bit.

23. The method as described in claim 22, wherein said interrupt broadcast address is assigned by said master device.

24. The method as described in claim 22, wherein said interrupt broadcast address is a default address.

25. The method as described in claim 22 wherein said interrupt broadcast address and said READ bit comprise one byte.

26. The method as described in claim 21, further comprising before said beginning an interrupt discovery process;
   assigning a unique identification number to each of said plurality of slave devices; and
   assigning each identification number to a unique clock in said clock sequence.

27. The method as described in claim 22, further comprising:
   receiving an acknowledge bit after said beginning an interrupt discovery process and said beginning a clock sequence from any slave device generating said interrupt condition.

28. The method as described in claim 27, further comprising:
   quitting said method of interrupt discovery when said acknowledge bit is not received.

29. The method as described in claim 21, further comprising:
   recognizing when said SDA line is pulled low during said clock sequence by other slave devices from said plurality of slave devices in initiating said interrupt condition;
   determining which clocks in said clock sequence are generated when said SDA line is pulled low; and
   identifying which slave devices are associated with said clocks in said clock sequence that are generated.

* * * * *